UNITED STATES PATENT OFFICE.

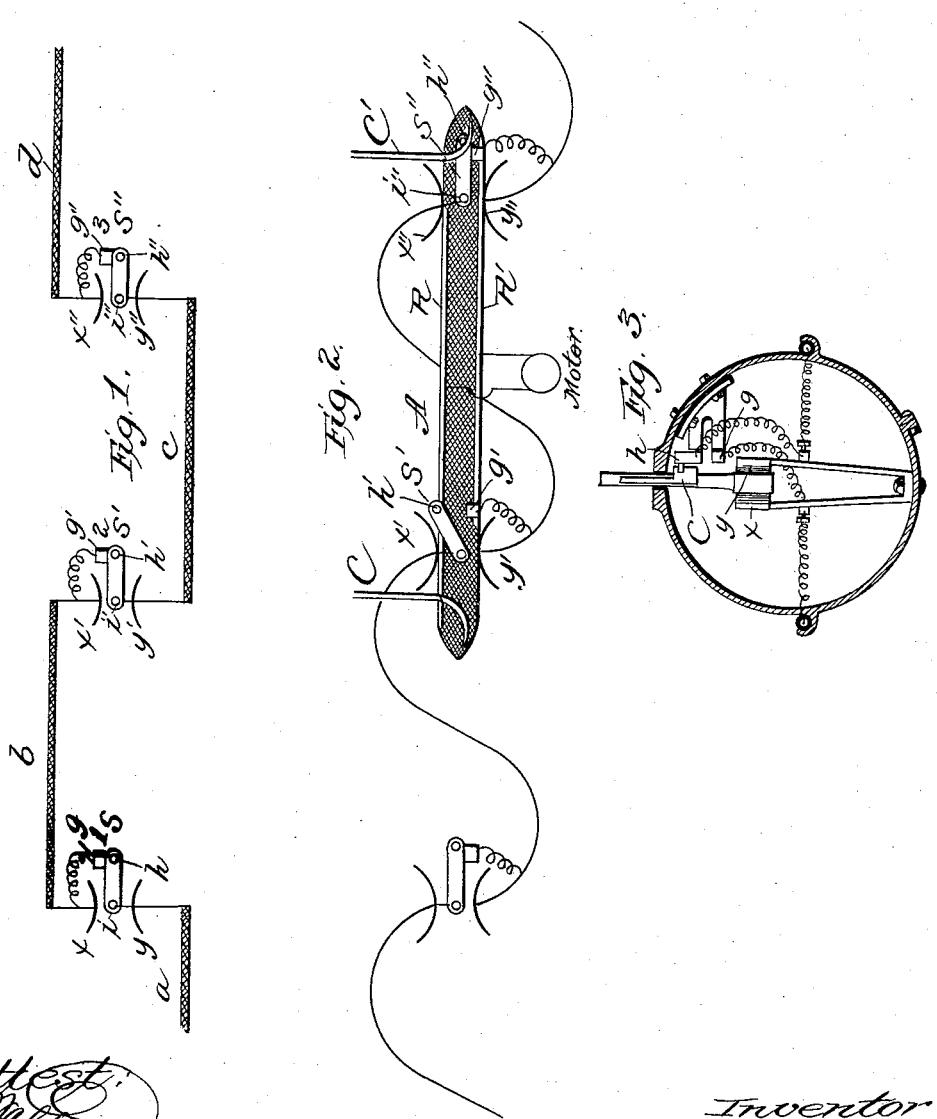

SIDNEY HOWE SHORT, OF DENVER, COLORADO.

ELECTRICAL RAILWAY.

SPECIFICATION forming part of Letters Patent No. 407,745, dated July 23, 1889.

Application filed April 15, 1887. Serial No. 234,984. (No model.)

*To all whom it may concern:*

Be it known that I, SIDNEY HOWE SHORT, of Denver, in the county of Arapahoe and State of Colorado, have invented a new and useful Improvement in Electrical Railways; and I do hereby declare that the following is a full, clear, and exact description of the same.

The object of this invention is to provide means for running cars by electricity with the use of a single insulated sectional conductor. This conductor is composed of ordinary wire covered throughout its length with some good insulating material and protected from moisture and injury in a manner well known to the art, being cut into sections of convenient length, and these cut ends are joined electrically by means of a throw-switch closed normally. The wire is electrically continuous; but when a motor is to be placed in circuit on the wire its terminals must be in connection with the ends of the sections of the wire and the switch between the sections opened. A current-gatherer must also be provided to continuously take the current from this point through the motor as the car moves. A long bar of insulated material is provided for the purpose, having on its sides conducting-strips, and for opening and closing the switches between the sections at the proper time I provide devices carried by the current-gatherer.

Figures 1 and 2 are diagrammatic views, and Fig. 3 a transverse section through the conduit and conductors.

Referring to Fig. 1, $a$ $b$ $c$ $d$ are the sections of insulated underground wire or cable, such as is used for electric-light purposes. At 1, 2, and 3 are shown the simple switches S S' S'', which connect the ends of the sections together electrically through $i, h$, and $g$, so that normally the current goes through the entire conductor in the manner indicated by the arrows. Below the switches are spring contact-pieces $x$ $y, x'$ $y', x''$ $y''$, between which the long insulating-bar passes, with its side conductors and motor in circuit, as shown in Fig. 2. The switches are normally closed, as shown in Fig. 1; but in order to loop in the motor the circuit must be broken at one of these switches, as shown at S', Fig. 2. At A is the current-collector, with its copper strips R R' arranged on its sides, as shown, the strip R being in contact with the contact-pieces $x'$ and the strip R' in contact with the contact-piece $y''$. These strips are connected electrically through the motor M. The switch S' has been opened by the switch-shifter C', which projects down from the car and moves just ahead of the current-gatherer, extending to one side thereof. This same shifter is about to open the switch S'' by coming in contact with the pin $h''$, which will swing the switch to one side of and away from its contact with $g''$, the switch-lever being pivoted at $i''$. The switch-shifter C is moving toward the open switch S', and by reason of its curved shape comes in contact with the pin $h'$ of this switch and throws the switch toward and into contact with the block $g'$, and thus closes the circuit between $x'$ and $y'$, the contact between $x''$ and $y''$ having been previously opened and the current made to pass through the motor as before, the current-collector always being between two of the contact-pieces.

I claim as my invention—

1. In an electric railway, the combination of an insulated underground wire or cable cut in sections, with throw-switches connecting the ends of the sections, and contact-plates at the ends of the sections with a space between them, and a current-collector adapted to operate the switches and collect the current through the contact-plates, substantially as described.

2. An electric railway having a single conductor composed of sections of insulated wire, the ends of the sections being connected together by switches, a switch-shifter for operating said switches, contact-plates on the ends of the sections with a space between them, and a suitable current-collector, substantially as described.

In testimony whereof I have signed my name to this specification in the presence of two subscribing witnesses.

SIDNEY HOWE SHORT.

Witnesses:
 RODNEY CURTIS,
 WM. N. BYERS.